H. CREMER.
BOTTLE CLOSURE.
APPLICATION FILED DEC. 21, 1914.

1,154,290.

Patented Sept. 21, 1915.

Witnesses:
Otto O Kalvelage
Anthony M Scholz

Inventor:
Henry Cremer

UNITED STATES PATENT OFFICE.

HENRY CREMER, OF CHICAGO, ILLINOIS.

BOTTLE-CLOSURE.

1,154,290.   Specification of Letters Patent.   Patented Sept. 21, 1915.

Application filed December 21, 1914. Serial No. 878,440.

*To all whom it may concern:*

Be it known that I, HENRY CREMER, a citizen of the United States, residing at 5817 Ridge avenue, city of Chicago, in the county of Cook and State of Illinois, have invented a new Bottle-Closure, of which the following is a specification.

My invention relates to bottle closures, and more particularly to the class designed to render a bottle or similar vessel non-refillable.

The improvement consists of a construction in which a tubular casing is provided at its lower end with seats, on the top one of which a transverse partition is resting provided with an upwardly directed sinuous passage and forming the bottom of a receptacle the top end of which is covered by a funnel shaped lid. This top part or lid is provided with a concave disk having a perforation communicating with a downwardly extended tubular passage, which forms in connection with the aperture of the lid a mouth or outlet.

The main object of my invention is to provide means designed and calculated to render bottles or similar vessels non-refillable.

Another object is to provide an attachment to prevent refilling of a bottle, with means to adapt the same for use in bottles or bottle necks with various caliber.

A further object is to provide a refilling preventing bottle stopper with an expedient to prevent irregular spouting or gulping ejections.

I attain these objects by the construction illustrated in the accompanying drawing, in which—

Figure 1:
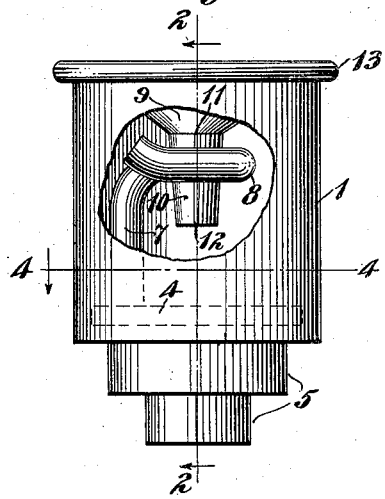
Figure 2:
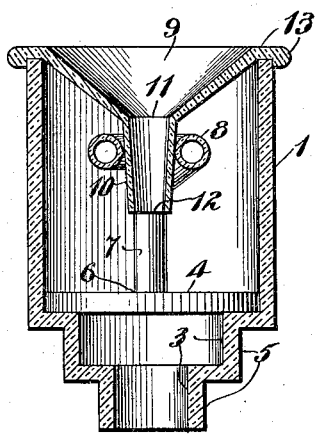
Figure 3:
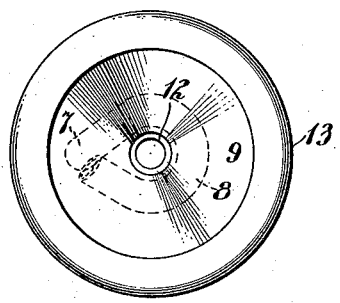
Figure 4:
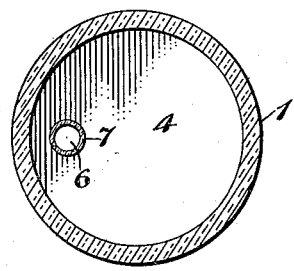

Figure 1, represents a partly sectional vertical view of the complete invention, showing a tubular casing partly broken away, with a transverse partition or diaphragm portion, a sinuous passage and a lid with a tubular passage in their respective place and position. Fig. 2, is a partly sectional vertical view cut at line 2—2 Fig. 1. Fig. 3, represents a top view showing the lid and contorted end of the sinuous passage. Fig. 4, is a sectional top view cut at 4—4 showing the casing with diaphragm and lower end of the sinuous passage.

Similar numerals refer to similar parts throughout the several views of the drawing.
As facilitation of construction is essential in the cost of manufacture, I form the device as a bottle-closure to be constructed independent of bottles, and provide the same with means of fastening, by which the interior parts can be reached from underneath whereby these parts can be more quickly and sanitarily prepared. To realize this, I provide a tubular casing 1 of suitable shape at its base with a step-like tubular portion tapering downwardly and forming exteriorly projecting tubular shoulders or offsets 5, which are disposed to give space to reach the interior from underneath for quicker and better adjustment and sanitary preparation of the interior parts. Said offsets 5 are adapted to be secured to bottles or similar vessels with cement or alloy, and to prevent the removing of the fastening cement or alloy with an instrument. Said step-shaped extension communicates at the upper end with the base of the casing 1 forming an interiorly projecting offset 3, which constitutes the support for a diaphragm-like transverse partition 4. The top of the casing 1 is covered by a lid having a concave disk provided with an aperture 11 which communicates with a downwardly directed tubular passage 10 of suitable size, the lower and free end 12 thereof extending into the casing 1. To coöperate with said passage 10 in attaining the main object, I provide the interior of the casing with an upwardly directed sinuous passage 7 of suitable size, the upper and free end thereof being bent or twisted around the tubular passage 10 to effect the arrest of the air. The lower end of the said sinuous passage is at the point 6 incorporated with a diaphragm or enlarged to form a diaphragm-like partition 4 which is secured to the offset 3 with cement or alloy, etc. These parts may be made in one piece without using foreign matter as cement, etc. The diaphragm portion is arranged to form in connection with casing and lid a receptacle through which the liquid flows when discharged from the bottle, and whereby the liquid is held to blockade the passages by an attempt to refill the bottle. The upper end of the tubular passage 10 forms the mouth to receive a cork or the like to seal the device. To fasten the lid to the casing 1, I provide the disk with a rim 13 overlapping the edge of the casing, and secure it thereto with cement or alloy, etc. The lid may also be countersunk into the casing. While I prefer to construct the device of glass, any other suitable material may be employed.

To operate the device it is necessary to have the diaphragm-like partition with upwardly directed sinuous passage inserted in the casing and secured air-tight to the interiorly projecting offset at the base of the casing. The top portion or lid with downwardly directed tubular passage is then to be adjusted to the upper end of the casing and fastened thereto rigidly and securely with cement or alloy, etc. The cork may be inserted before or after the lid is adjusted. The bottle-closure prepared in this manner, is to be rigidly secured to a filled bottle or similar vessel which may then be emptied of its contents in the usual way. After the cork has been removed, and the bottle is tilted, the liquid will pass through the sinuous passage into the receptacle formed by the tubular casing, diaphragm portion and lid, from where the liquid passes through the downwardly directed tubular passage of the lid and the mouth to the open air.

By an attempt to refill a bottle provided with a stopper constructed in aforesaid manner, the liquid will pass through the mouth and tubular passage of the lid into the said receptacle in which the liquid rises above the lower and free end of the tubular passage from the lid, whereby the liquid blockades the sinuous passage and prevents the air to escape. The peculiar twist of the free end of the sinuous passage is calculated to effect a blockade for the arrest of the air in any direction and position of the bottle, and as no two bodies can occupy the same space at the same time, the liquid will be excluded.

What I claim as my invention and desire to secure by Letters Patent is:—

A bottle-closure having a tubular casing covered by a lid which is provided with an aperture communicating with a downwardly directed tubular passage, the free end thereof extending into the tubular casing, said casing being in its interior provided with an upwardly directed sinuous passage, which is arranged to have its upper and free end contorted around the tubular passage from the lid in coöperative relationship to arrest the air, the lower end of said sinuous passage being incorporated in a diaphragm portion or enlarged so as to form a diaphragm, which is secured to an inwardly projecting offset, formed by a tubular extension tapering in step-shape, downwardly from the base of the casing, to build exteriorly projecting offsets, said diaphragm portion forming in connection with casing and lid a receptacle through which the liquid flows when discharged from the bottle, and by which the liquid is held to blockade the passages by an attempt of refilling, substantially for the purpose set forth.

In testimony whereof I have signed my name in presence of two subscribing witnesses.

HENRY CREMER.

Witnesses:
OTTO P. KALVELAGE,
ANTHONY M. SCHALZ.

Copies of this patent may be obtained for five cents each, by addressing the "Commissioner of Patents, Washington, D. C."